United States Patent
Balasubramanian et al.

(10) Patent No.: US 12,431,135 B2
(45) Date of Patent: Sep. 30, 2025

(54) SYSTEM AND METHOD FOR CROSS-DOMAIN AND CROSS-LINGUISTIC KNOWLEDGE-REINFORCED USER SERVICING

(71) Applicant: Bank of America Corporation, Charlotte, NC (US)

(72) Inventors: Saravanan Balasubramanian, Chennai (IN); Durga Prasad Kutthumolu, Hyderabad (IN); Venkata Karthik Ryali, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 339 days.

(21) Appl. No.: 18/310,929

(22) Filed: May 2, 2023

(65) Prior Publication Data

US 2024/0371371 A1 Nov. 7, 2024

(51) Int. Cl.

| | |
|---|---|
| *G10L 15/22* | (2006.01) |
| *G06F 9/451* | (2018.01) |
| *G06F 16/242* | (2019.01) |
| *G06F 40/58* | (2020.01) |
| *G10L 15/00* | (2013.01) |
| *G10L 15/06* | (2013.01) |
| *G10L 15/30* | (2013.01) |
| *G10L 15/32* | (2013.01) |
| *H04L 9/40* | (2022.01) |

(52) U.S. Cl.
CPC .............. *G10L 15/22* (2013.01); *G06F 9/453* (2018.02); *G06F 9/454* (2018.02); *G06F 16/243* (2019.01); *G06F 40/58* (2020.01); *G10L 15/005* (2013.01); *G10L 15/063* (2013.01); *G10L 15/30* (2013.01); *G10L 15/32* (2013.01); *H04L 63/08* (2013.01); *G10L 2015/0635* (2013.01)

(58) Field of Classification Search
CPC ..... G10L 15/22; G10L 15/005; G10L 15/063; G10L 15/30; G10L 15/32; G10L 2015/0635; G10L 2015/223; G10L 13/027; G10L 13/033; G06F 9/453; G06F 9/454; G06F 16/243; G06F 40/58; H04L 63/08

See application file for complete search history.

(56) References Cited

U.S. PATENT DOCUMENTS

| | | | |
|---|---|---|---|
| 9,211,077 B2 | 12/2015 | Jung et al. | |
| 10,025,447 B1* | 7/2018 | Dixit | G06F 3/011 |
| 10,146,768 B2 | 12/2018 | Fuxman et al. | |

(Continued)

*Primary Examiner* — Michael Colucci

(57) ABSTRACT

A method includes generating a metaverse session, a first avatar of a first user, and a virtual advisor avatar. The first user is allowed access to the metaverse session using the first avatar. A voice query of the first user is received and analyzed to determine a preferred language/dialect of the first user, and an issue and a domain of the voice query. In response to determining that a language/knowledge server includes a response corresponding to the issue and the domain, the response is retrieved from the language/knowledge server. In response to determining that a language/dialect of the response matches the preferred language/dialect of the first user, a first voice response is generated from the retrieved response. The first voice response is in the preferred language/dialect of the first user. The first voice response is communicated to the first user using the virtual advisor avatar.

20 Claims, 4 Drawing Sheets

(56) References Cited

U.S. PATENT DOCUMENTS

| | | |
|---|---|---|
| 10,635,752 B2 | 4/2020 | Zhou et al. |
| 10,642,913 B2 | 5/2020 | Sharma et al. |
| 10,666,582 B2 | 5/2020 | Viswanathan et al. |
| 10,679,011 B2 | 6/2020 | Galitsky |
| 10,848,572 B2 | 11/2020 | Sagar et al. |
| 10,866,978 B2 | 12/2020 | Raison et al. |
| 10,872,083 B2 | 12/2020 | Lin et al. |
| 10,922,491 B2 | 2/2021 | Renard |
| 11,195,532 B2 | 12/2021 | Teserra et al. |
| 11,431,657 B2 | 8/2022 | Whitten et al. |
| 2018/0053119 A1 | 2/2018 | Zeng et al. |
| 2018/0102989 A1 | 4/2018 | Borsutsky et al. |
| 2019/0103111 A1 | 4/2019 | Tiwari et al. |
| 2019/0189121 A1* | 6/2019 | Schlesinger ........ G06F 16/3329 |
| 2020/0365147 A1* | 11/2020 | Cordell ................. G06T 13/205 |
| 2020/0387550 A1 | 12/2020 | Cappetta et al. |
| 2021/0312399 A1* | 10/2021 | Asokan .................... G10L 15/22 |
| 2024/0242539 A1* | 7/2024 | Su ........................ G06V 40/176 |
| 2024/0283868 A1* | 8/2024 | Ferris ..................... G10L 15/22 |

\* cited by examiner

SYSTEM AND METHOD FOR CROSS-DOMAIN AND CROSS-LINGUISTIC KNOWLEDGE-REINFORCED USER SERVICING

TECHNICAL FIELD

The present disclosure relates generally to user-entity interactions, and more specifically to a system and method for cross-domain and cross-linguistic knowledge-reinforced user servicing.

BACKGROUND

An entity (e.g., a bank) may have a plurality of advisors that interact with a plurality of users and provide responses to various queries of the users. An advisor may not be able to understand needs of a user, may not be able to provide a response to queries of the user due to lack of knowledge, and/or may even not be able to converse in a preferred language of the user. Accordingly, a system and method for efficient user-entity communication is needed that overcome shortcoming discussed above.

SUMMARY

The system described in the present disclosure provides several practical applications and technical advantages that overcome the current technical problems with user servicing.

In general, the system for cross-domain and cross-linguistic knowledge-reinforced user servicing allows a user to access a metaverse session using a user avatar and communicate with a virtual advisor avatar to resolve their issues or to receive a desired service. The system receives a voice query from the user and determines a preferred language/dialect of the user. The system further determines a domain for issues raised in the voice query. The system searches a knowledge server for a response corresponding to the voice query. In response to determining that the knowledge server stores the response corresponding to the voice query, the system retrieves the response from the knowledge server. The system generates a voice response from the retrieved response, where the voice response is in the preferred language/dialect of the first user. The system communicates the voice response to the user using the virtual advisor avatar. In response to determining that the knowledge server does not store the response corresponding to the voice query, the system determines a regional center based on a location of the user and determines an available advisor within the regional center. The system notifies the available advisor that the user requires assistance and allows the available advisor access to the metaverse session using the virtual advisor avatar. In response to determining that a preferred language/dialect of the available advisor is same as the preferred language/dialect of the user, the system communicates the voice query to the available advisor, receives a voice response from the available advisor, and communicates the voice response to the user using the virtual advisor avatar. In response to determining that the preferred language/dialect of the available advisor is not same as the preferred language/dialect of the first user, the system translates the voice query of the user to the preferred language/dialect of the available advisor and communicates the translated voice query to the available advisor. The system receives a voice response from the available advisor, translates the voice response to the preferred language/dialect of the user, and communicate the translated voice response to the user using the virtual advisor avatar. The knowledge server is updated based on the voice response from the available advisor, such that subsequent users are provided with responses more efficiently and without involving an assistance form a physical advisor.

The system for cross-domain and cross-linguistic knowledge-reinforced user servicing allows a user to effectively communicate and resolve issues in a preferred language/dialect of the user with or without involving a physical advisor. The system further allows for effective communication between a user and a physical advisor even of the user and the physical advisor have different preferred languages/dialects. The system further allows updating a knowledge level based on responses of physical advisors, such that subsequent users are provided with responses more efficiently and without involving an assistance form a physical advisor. By improving efficiency of user servicing, computing resources (e.g., memory, or network bandwidth) needed for the system for cross-domain and cross-linguistic knowledge-reinforced user servicing may be reduced.

Accordingly, the following disclosure is particularly integrated into practical applications of: (1) improving efficiency of user servicing; and (2) reducing utilization of computing resources (e.g., memory, or network bandwidth) needed for the system for cross-domain and cross-linguistic knowledge-reinforced user servicing.

In one embodiment, a system includes a metaverse server and a decentralized computing system communicatively coupled to the metaverse server. The metaverse server includes a first memory and a first processor communicatively coupled to the first memory. The first memory is configured to store user credential of a plurality of users. The first processor is configured to receive first user credentials of a first user from a first user device, authenticate the first user based on the first user credentials, generate a metaverse session, generate a first avatar of the first user; generate a virtual advisor avatar, allow the first user access to the metaverse session using the first avatar, receive a voice query of the first user from the first user device, send the voice query to a decentralized computing system, in response to sending the voice query to the decentralized computing system, receive a first voice response from the decentralized computing system, and communicate the first voice response to the first user using the virtual advisor avatar. The decentralized computing system includes a plurality of second processors. The plurality of second processors are configured to implement a plurality of bots. The plurality of bots include a primary bot and a plurality of secondary bots. The plurality of second processors of the decentralized computing system are configured to receive, by the primary bot, the voice query from the metaverse server, and analyze, by the primary bot, the voice query to determine a preferred language/dialect of the first user, an issue and a domain of the voice query, and a respective probability score for each secondary bot. The plurality of second processors of the decentralized computing system are further configured to identify a secondary bot with a highest probability score, the secondary bot with the highest probability score being configured to respond to the voice query in the preferred language/dialect of the first user, search a language/knowledge server for a response corresponding to the issue and the domain, in response to determining that the language/knowledge server includes the response corresponding to the issue and the domain, retrieve the response from the language/knowledge server, determine a language/dialect of the response, in response to determining that the language/dialect of the response matches the preferred language/dialect of the first user, generate, by the secondary bot with the highest probability score, the first voice response from the retrieved response, wherein the first voice response is in the preferred language/dialect of the first user, and send the first voice response to the metaverse server.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

As described above, previous technologies fail to provide effective systems and methods for user servicing. Embodiments of the present disclosure and their advantages may be understood by referring to FIGS. 1, 2A, 2B, and 2C. FIGS. 1, 2A, 2B, and 2C are used to describe a system and method for cross-domain and cross-linguistic knowledge-reinforced user servicing.

System Overview

Figure 1:
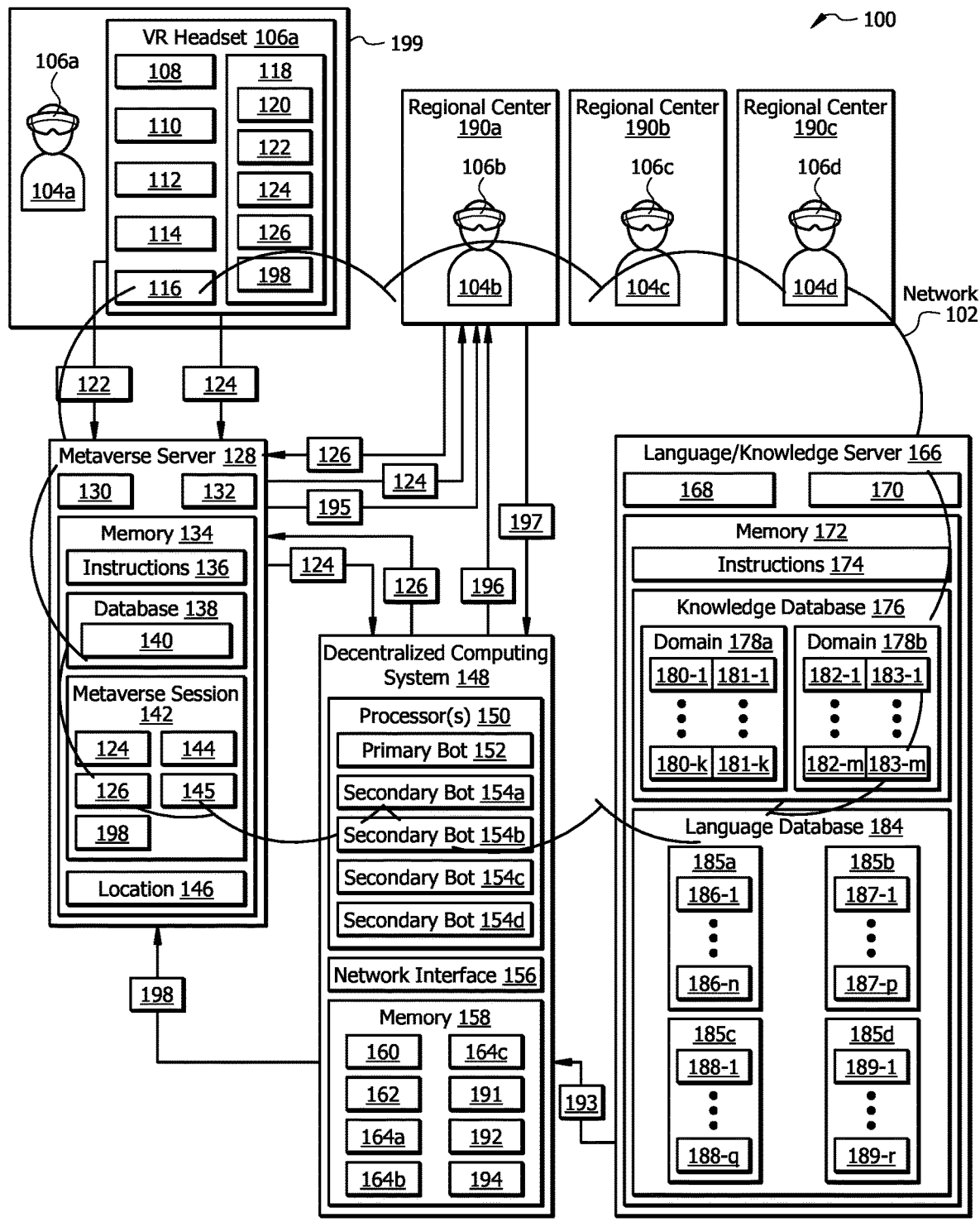
FIG. 1 illustrates an embodiment of a system for cross-domain and cross-linguistic knowledge-reinforced user servicing.

FIG. 1 illustrates an embodiment of a system 100 for cross-domain and cross-linguistic knowledge-reinforced user servicing. The system 100 may provide services to one or more users (e.g., user 104a) for an entity. The entity may be an organization, a company, a business, or the like. The system 100 may use one or more physical advisors (e.g., advisors 104b through 104d) to assist in providing services to the users (e.g., user 104a).

In certain embodiments, the system 100 comprises a plurality of user devices 106a through 106d operably coupled to a metaverse server 128, a decentralized computing system 148, and a language/knowledge server 166 via a network 102. Network 102 enables the communication between the components of the system 100. In other embodiments, the system 100 may not have all the components listed and/or may have other elements instead of, or in addition to, those listed above. For example, the language/knowledge server 166 may be integrated into the metaverse server 128 or the decentralized computing system 148.

In general, the metaverse server 128 of the system 100 allows a user 104a to access a metaverse session 142 using a user avatar 144 and communicate with a virtual advisor avatar 145 to resolve their issues and/or receive a desired service. The metaverse server 128 receives a voice query 124 from the user 104a and sends the voice query 124 to the decentralized computing system 148. The decentralized computing system 148 determines a preferred language/dialect 164a of the user 104a. The decentralized computing system 148 further determines an issue 192 and a domain 191 of the issue 192 based on the voice query 124. The decentralized computing system 148 searches the language/knowledge server 166 for a response 193 corresponding to the domain 191 and the issue 192.

In response to determining that the language/knowledge server 166 stores the response 193 corresponding to the domain 191 and the issue 192, the decentralized computing system 148 retrieves the response 193 from the language/knowledge server 166. The decentralized computing system 148 generates a voice response 126 from the retrieved response 193, where the voice response 126 is in the preferred language/dialect 154a of the user 104a. The metaverse server 128 receives voice response 126 from the decentralized computing system 148 and communicates the voice response 126 to the user 104a using the virtual advisor avatar 145.

In response to determining that the language/knowledge server 166 does not store a response corresponding to the domain 191 and the issue 192, the metaverse server 128 determines a regional center (e.g., respective one of regional centers 190a through 190c) based on a location 146 of the user and determines an available advisor (e.g., respective one of advisors 104b through 104d) within the regional center (e.g., respective one of regional centers 190a through 190c). The metaverse server 128 notifies the available advisor (e.g., respective one of advisors 104b through 104d) that the user 104a requires assistance and allows the available advisor (e.g., respective one of advisors 104b through 104d) access to the metaverse session 142 using the virtual advisor avatar 145.

In response to determining that a preferred language/dialect 164c of the available advisor (e.g., respective one of advisors 104b through 104d) is same as the preferred language/dialect 164a of the user 104a, the metaverse server 128 communicates the voice query 124 to the available advisor (e.g., respective one of advisors 104b through 104d), receives a voice response 126 from the available advisor (e.g., respective one of advisors 104b through 104d), and communicates the voice response 126 to the user 104a using the virtual advisor avatar 145.

In response to determining that a preferred language/dialect 164c of the available advisor (e.g., respective one of advisors 104b through 104d) is not same as the preferred language/dialect 164a of the user 104a, the decentralized computing system 148 translates the voice query 126 of the user 104a to the preferred language/dialect 164c of the available advisor (e.g., respective one of advisors 104b through 104d) and communicates the translated voice query 196 to the available advisor (e.g., respective one of advisors 104b through 104d). The decentralized computing system 148 receives a voice response 197 from the available advisor (e.g., respective one of advisors 104b through 104d) and translates the voice response 197 to the preferred language/dialect 164a of the user 104a. The metaverse server 128 receives the translated voice response 198 from the decentralized computing system 148 and communicates the translated voice response 198 to the user 104a using the virtual advisor avatar 145. The metaverse server 128 updates the language/knowledge server 166 based on the translated voice response 198.

System Components

Network

Network 102 may be any suitable type of wireless and/or wired network. The network 102 may or may not be connected to the Internet or public network. The network 102 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. The network 102 may be configured to support any suitable type of communication protocol as would be appreciated by one of ordinary skill in the art.

User Devices

Each of the user devices 106a through 106d is generally any device that is configured to process data and interact with a user 104a and advisors 104b through 104d, respectively. Examples of a user device include, but are not limited to, a personal computer, a desktop computer, a workstation, a server, a laptop, a tablet computer, a mobile phone (such as a smartphone), a virtual reality headset, etc. Each of the user devices 106a through 106d may include a user interface, such as a display 112, a microphone 114, a speaker 116, a keypad, or other appropriate terminal equipment usable by a respective one of the user 104a and the advisors 104b through 104d. In one embodiment, the user devices 106a through 106d are VR headsets.

The user device 106a may comprise a processor 108 in signal communication with a memory 118 and a network interface 110. The processor 108 comprises one or more processors operably coupled to the memory 118. The processor 108 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 108 may be a programmable logic device, a microcontroller, a microprocessor, or any suitable combination of the preceding. The one or more processors are configured to process data and may be implemented in hardware or software. For example, each of the processor 108 may be 8-bit, 16-bit, 32-bit, 64-bit, or of any other suitable architecture. The one or more processors are configured to implement various software instructions to perform the operations described herein. For example, the one or more processors are configured to execute software instructions 120 and perform one or more functions described herein.

The network interface 110 is configured to enable wired and/or wireless communications (e.g., via network 102). The network interface 110 is configured to communicate data between the user device 106a and other components of the system 100. For example, the network interface 110 may comprise a WIFI interface, a local area network (LAN) interface, a wide area network (WAN) interface, a modem, a switch, or a router. The processor 108 is configured to send and receive data using the network interface 110. The network interface 110 may be configured to use any suitable type of communication protocol as would be appreciated by one of ordinary skill in the art.

The memory 118 may be volatile or non-volatile and may comprise a read-only memory (ROM), random-access memory (RAM), ternary content-addressable memory (TCAM), dynamic random-access memory (DRAM), and static random-access memory (SRAM). The memory 118 may be implemented using one or more disks, tape drives, solid-state drives, and/or the like. The memory 118 may store any of the information described in FIGS. 1, 2A, 2B, and 2C along with any other data, instructions, logic, rules, or code operable to implement the function(s) described herein when executed by the processor 108. The memory 118 is operable to store the software instructions 120, and/or any other data and instructions. The software instructions 120 may comprise any suitable set of software instructions, logic, rules, or code operable to be executed by the processor 108. The memory 118 may further store user credentials 122 of the user 104a. The user devices 106b through 106d may be similar to the user device 106a and the description is not repeated herein.

In operation, the user device 106a is configured to send the user credentials 122 to the metaverse server 128. The user device 106a is further configured to capture a voice query 124 of the user 104a. In certain embodiments, the voice query 124 is captured by the microphone 114 of the user device 106a. The user device 106a is further configured to communicate voice responses (e.g., voice responses 126 and 198) to the user 104a. In certain embodiments, the voice responses (e.g., voice responses 126 and 198) are communicated to the user 104a by the speaker 116 of the user device 106a. The user device 106a is further configured to access the metaverse session 142 hosted by the metaverse server 128 using the user avatar 144 and communicate with the virtual advisor avatar 145 within the metaverse session 142. In certain embodiments, the user device 106a may be located in a metaverse kiosk 199, which may be placed in a public space.

Metaverse Server

The metaverse server 128 is generally any device that is configured to process data and communicate with other components of the system 100 via the network 102. The metaverse server 128 may comprise a processor 130 in signal communication with a memory 134 and a network interface 132.

Processor 130 comprises one or more processors operably coupled to the memory 134. The processor 130 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 130 may be a programmable logic device, a microcontroller, a microprocessor, or any suitable combination of the preceding. The one or more processors are configured to process data and may be implemented in hardware or software. For example, the processor 130 may be 8-bit, 16-bit, 32-bit, 64-bit, or of any other suitable architecture. The one or more processors are configured to implement various software instructions to perform the operations described herein. For example, the one or more processors are configured to execute software instructions 136 and perform one or more functions described herein.

Network interface 132 is configured to enable wired and/or wireless communications (e.g., via network 102). The network interface 132 is configured to communicate data between the metaverse server 128 and other components of the system 100. For example, the network interface 132 may comprise a WIFI interface, a local area network (LAN) interface, a wide area network (WAN) interface, a modem, a switch, or a router. The processor 130 is configured to send and receive data using the network interface 132. The network interface 132 may be configured to use any suitable type of communication protocol as would be appreciated by one of ordinary skill in the art.

Memory 134 may be volatile or non-volatile and may comprise a read-only memory (ROM), random-access memory (RAM), ternary content-addressable memory (TCAM), dynamic random-access memory (DRAM), and static random-access memory (SRAM). Memory 134 may be implemented using one or more disks, tape drives, solid-state drives, and/or the like. The memory 134 may store any of the information described in FIGS. 1, 2A, 2B, and 2C along with any other data, instructions, logic, rules, or code operable to implement the function(s) described herein. The memory 134 is operable to store software instructions 136, and/or any other data and instructions. The software instructions 136 may comprise any suitable set of software instructions, logic, rules, or code operable to be executed by the processor 130. Memory 134 may further store one or more metaverse sessions (e.g., metaverse session 142).

In operation, the metaverse server 128 is configured to allow the user 104a and the advisors 104b through 104d access to the one or more metaverse sessions (e.g., metaverse session 142). In certain embodiments, the metaverse server 128 is further configured to determine a location 146 of the user 104a and identify a regional center (e.g., respective one of regional centers 190a through 190c) based on the location 146. In embodiments when the system 100 is configured to provide services for a bank, the regional centers 190a through 190c may be European regional center, a north American regional center, and Asia-pacific center, respectively.

Language/Knowledge Server

The language/knowledge server 166 is generally any device that is configured to process data and communicate with other components of the system 100 via the network 102. The language/knowledge server 166 may comprise a processor 168 in signal communication with a memory 172 and a network interface 170.

Processor 168 comprises one or more processors operably coupled to the memory 172. The processor 168 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 168 may be a programmable logic device, a microcontroller, a microprocessor, or any suitable combination of the preceding. The one or more processors are configured to process data and may be implemented in hardware or software. For example, the processor 168 may be 8-bit, 16-bit, 32-bit, 64-bit, or of any other suitable architecture. The one or more processors are configured to implement various software instructions to perform the operations described herein. For example, the one or more processors are configured to execute software instructions 174 and perform one or more functions described herein.

Network interface 170 is configured to enable wired and/or wireless communications (e.g., via network 102). The network interface 170 is configured to communicate data between the language/knowledge server 166 and other components of the system 100. For example, the network interface 170 may comprise a WIFI interface, a local area network (LAN) interface, a wide area network (WAN) interface, a modem, a switch, or a router. The processor 168 is configured to send and receive data using the network interface 170. The network interface 170 may be configured to use any suitable type of communication protocol as would be appreciated by one of ordinary skill in the art.

Memory 172 may be volatile or non-volatile and may comprise a read-only memory (ROM), random-access memory (RAM), ternary content-addressable memory (TCAM), dynamic random-access memory (DRAM), and static random-access memory (SRAM). Memory 172 may be implemented using one or more disks, tape drives, solid-state drives, and/or the like. The memory 172 may store any of the information described in FIGS. 1, 2A, 2B, and 2C along with any other data, instructions, logic, rules, or code operable to implement the function(s) described herein. The memory 172 is operable to store software instructions 174, and/or any other data and instructions. The software instructions 174 may comprise any suitable set of software instructions, logic, rules, or code operable to be executed by the processor 168.

The memory 172 may further store a knowledge database 176 and a language database 184. In certain embodiments, the knowledge database 176 comprises a plurality of issues and respective responses for a plurality of domains. In embodiments when the system 100 is configured to provide services for a bank, domains may include retirement, wealth, wholesale banking, retail banking, credit card, automated teller machine (ATM), insurance, online transactions, interest rates, privacy, and the like.

In one embodiment, the knowledge database 176 comprises a plurality of issues and respective responses for two different domains 178a and 178b. The knowledge database 176 includes issues 180-1 through and 180-k and respective responses 181-1 through 181-k for the domains 178a, and issues 182-1 through and 182-m and respective responses 183-1 through 183-m for the domains 178b. Each of the responses 181-1 through 181-k corresponds to a respective one of the issues 180-1 through and 180-k, such that each of the responses 181-1 through 181-k includes a plurality of responses in different languages. Each of the responses 183-1 through 183-m corresponds to a respective one of the issues 182-1 through and 182-m, such that each of the responses 183-1 through 183-m includes a plurality of responses in different languages. In other embodiments, the knowledge database 176 may comprise a plurality of issues and respective responses for more than two domains.

The language database 184 comprises language vocabularies for a plurality of languages. In one embodiment, the language database 184 comprises four language vocabularies 185a through 185d. The language vocabularies 185a may include a plurality of regional dialects 186-1 through 186-n. The language vocabularies 185b may include a plurality of regional dialects 187-1 through 186-p. The language vocabularies 185c may include a plurality of regional dialects 188-1 through 188-q. The language vocabularies 185d may include a plurality of regional dialects 189-1 through 189-r. In other embodiments, the language database 184 may comprise more than four language vocabularies.

Decentralized Computing System

The decentralized computing system 148 is generally any device that is configured to process data and communicate with other components of the system 100 via the network 102. The decentralized computing system 148 may comprise a plurality of computing systems (not shown) in signal communication with one another. The decentralized computing system 148 may comprise a processor 150 in signal communication with a memory 158 and a network interface 156.

Processor 150 comprises one or more processors operably coupled to the memory 158. The processor 150 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 150 may be a programmable logic device, a microcontroller, a microprocessor, or any suitable combination of the preceding. The one or more processors are configured to process data and may be implemented in hardware or software. For example, the processor 150 may be 8-bit, 16-bit, 32-bit, 64-bit, or of any other suitable architecture. The one or more processors are configured to implement various software instructions to perform the operations described herein. For example, the one or more processors are configured to execute software instructions 160 and perform one or more functions described herein.

In certain embodiments, the processor 150 may be configured to implement a primary bot 152 and a plurality of secondary bots 154a through 154d. Each of the secondary bots 154a through 154d may be configured to allow the system 100 to communicate with a user using a respective language/dialect.

Network interface 156 is configured to enable wired and/or wireless communications (e.g., via network 102). The network interface 156 is configured to communicate data between the decentralized computing system 148 and other components of the system 100. For example, the network interface 156 may comprise a WIFI interface, a local area network (LAN) interface, a wide area network (WAN) interface, a modem, a switch, or a router. The processor 150 is configured to send and receive data using the network interface 156. The network interface 156 may be configured to use any suitable type of communication protocol as would be appreciated by one of ordinary skill in the art.

Memory 158 may be volatile or non-volatile and may comprise a read-only memory (ROM), random-access memory (RAM), ternary content-addressable memory (TCAM), dynamic random-access memory (DRAM), and static random-access memory (SRAM). Memory 158 may be implemented using one or more disks, tape drives, solid-state drives, and/or the like. The memory 158 may store any of the information described in FIGS. 1, 2A, 2B, and 2C along with any other data, instructions, logic, rules, or code operable to implement the function(s) described herein. The memory 158 is operable to store software instructions 160, and/or any other data and instructions. The software instructions 160 may comprise any suitable set of software instructions, logic, rules, or code operable to be executed by the processor 150.

In operation, the decentralized computing system 148 received the voice query 124 from the metaverse server 128. The primary bot 152 of the decentralized computing system 148 determines the preferred language/dialect 164a of the user 104a. In certain embodiments, the primary bot 152 of the decentralized computing system 148 may compare the voice query 124 to language vocabularies (e.g., language vocabularies 185a through 185d) stored in the language/knowledge server 166 to determine the preferred language/dialect 164a of the user 104a. The primary bot 152 of the decentralized computing system 148 further determines an issue 192 and a domain 191 of the issue 192 based on the voice query 124. The primary bot 152 of the decentralized computing system 148 determines a respective probability score 162 for each of the secondary bots 154a through 154d. Each probability score 162 determines an ability of a respective one of the secondary bots 154a through 154d to communicate with the user 104a using the preferred language/dialect 164a of the user 104a. The primary bot 152 of the decentralized computing system 148 further identifies a secondary bot with the highest probability score. The secondary bot with the highest probability score is configured to respond to the voice query 124 of the user 104a in the preferred language/dialect 164a of the user 104a. The decentralized computing system 148 searches the language/knowledge server 166 for a response 193 corresponding to the domain 191 and the issue 192. In certain embodiments, the decentralized computing system 148 searches the knowledge database 176 of the language/knowledge server 166 to determine if the domain 191 and the issue 192 match with domains 178a and 178b and respective issues 180-1 through 180-k and 182-1 through 182-m and identifies respective one of the responses 181-1 through 181-m and 183-1 through 183-m as a desired response 193.

In response to determining that the language/knowledge server 166 stores the response 193 corresponding to the domain 191 and the issue 192, the decentralized computing system 148 retrieves the response 193 from the language/knowledge server 166. The primary bot 152 of the decentralized computing system 148 determines the language/dialect 164b of the response 193. The primary bot 152 of the decentralized computing system 148 further determines if the language/dialect 164b of the response 193 matches the preferred language/dialect 164a of the user 104a.

In response to determining that the language/dialect 164b of the response 193 matches the preferred language/dialect 164a of the user 104a, the secondary bot with the highest probability score generates a voice response 126 from the response 193. The decentralized computing system 148 sends the voice response 126 to the metaverse server 128.

In response to determining that the language/dialect 164b of the response 193 does not match the preferred language/dialect 164a of the user 104a, the primary bot 152 of the decentralized computing system 148 translates the response 193 into the preferred language/dialect 164a of the user 104a. Subsequently, the secondary bot with the highest probability score generates a voice response 126 from the translated response 194. The decentralized computing system 148 sends the voice response 126 to the metaverse server 128.

In response to determining that the language/knowledge server 166 does not store a response corresponding to the domain 191 and the issue 192, the metaverse server 128 determines a regional center (e.g., respective one of regional centers 190a through 190c) based on a location 146 of the user and determines an available advisor (e.g., respective one of advisors 104b through 104d) within the regional center (e.g., respective one of regional centers 190a through 190c). The metaverse server 128 notifies the available advisor (e.g., respective one of advisors 104b through 104d) that the user 104a requires assistance and allows the available advisor (e.g., respective one of advisors 104b through 104d) access to the metaverse session 142 using the virtual advisor avatar 145.

In response to determining that a preferred language/dialect 164c of the available advisor (e.g., respective one of advisors 104b through 104d) is same as the preferred language/dialect 164a of the user 104a, the metaverse server 128 communicates the voice query 124 to the available advisor (e.g., respective one of advisors 104b through 104d), receives a voice response 126 from the available advisor (e.g., respective one of advisors 104b through 104d), and communicates the voice response 126 to the user 104a using the virtual advisor avatar 145.

In response to determining that the preferred language/dialect 164c of the available advisor (e.g., respective one of advisors 104b through 104d) is not same as the preferred language/dialect 164a of the user 104a, the decentralized computing system 148 translates the voice query 126 of the user 104a to the preferred language/dialect 164c of the available advisor (e.g., respective one of advisors 104b through 104d) and communicates the translated voice query 196 to the available advisor (e.g., respective one of advisors 104b through 104d). The decentralized computing system 148 receives a voice response 197 from the available advisor (e.g., respective one of advisors 104b through 104d), translates the voice response 197 to the preferred language/dialect 164a of the user 104a, and sends the translated voice response 198 to the metaverse server 128.

Figure 2A:
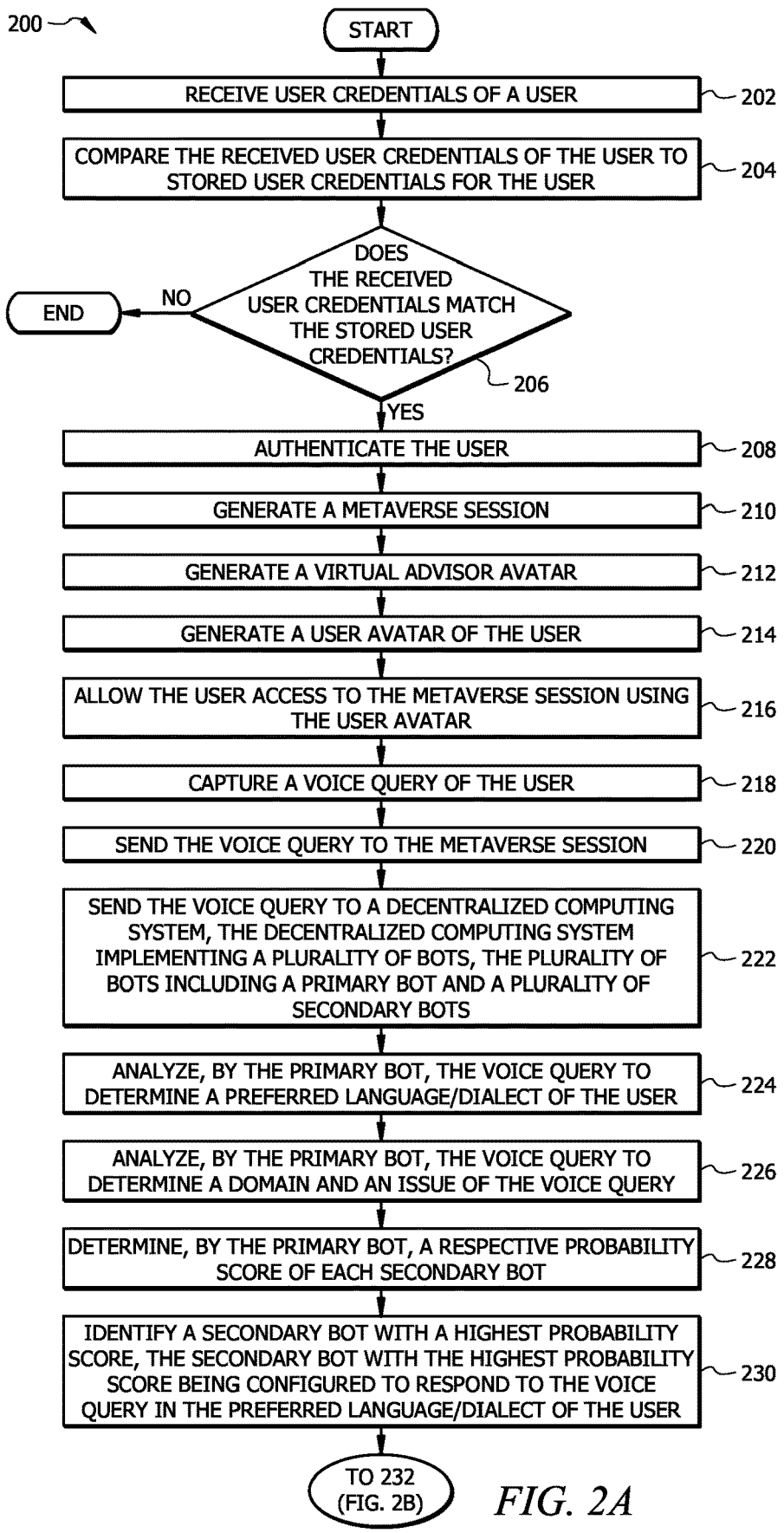
FIGS. 2A, 2B and 2C illustrate an example operational flow of system of FIG. 1 for cross-domain and cross-linguistic knowledge-reinforced user servicing.
Figure 2B:
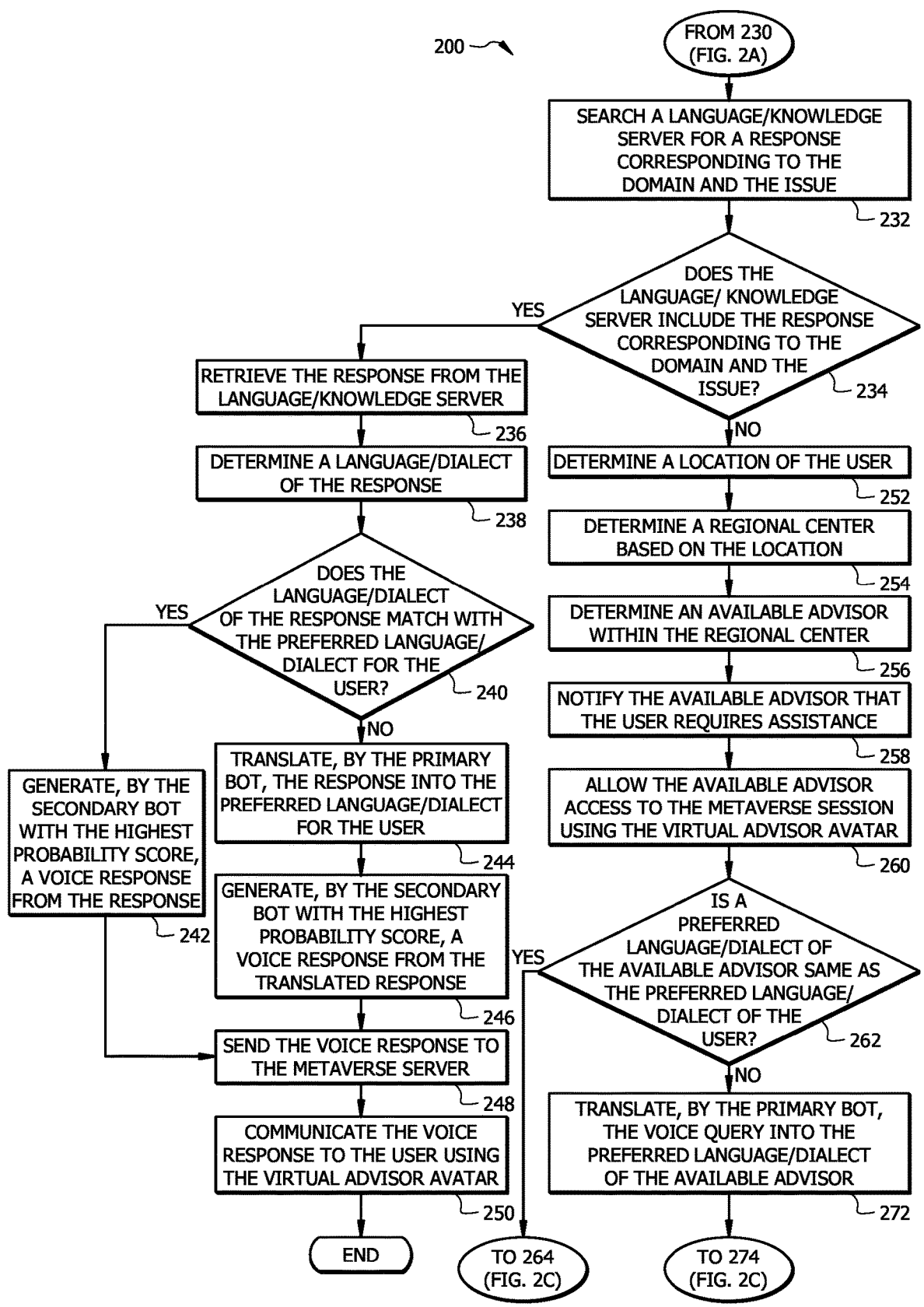
Figure 2C:
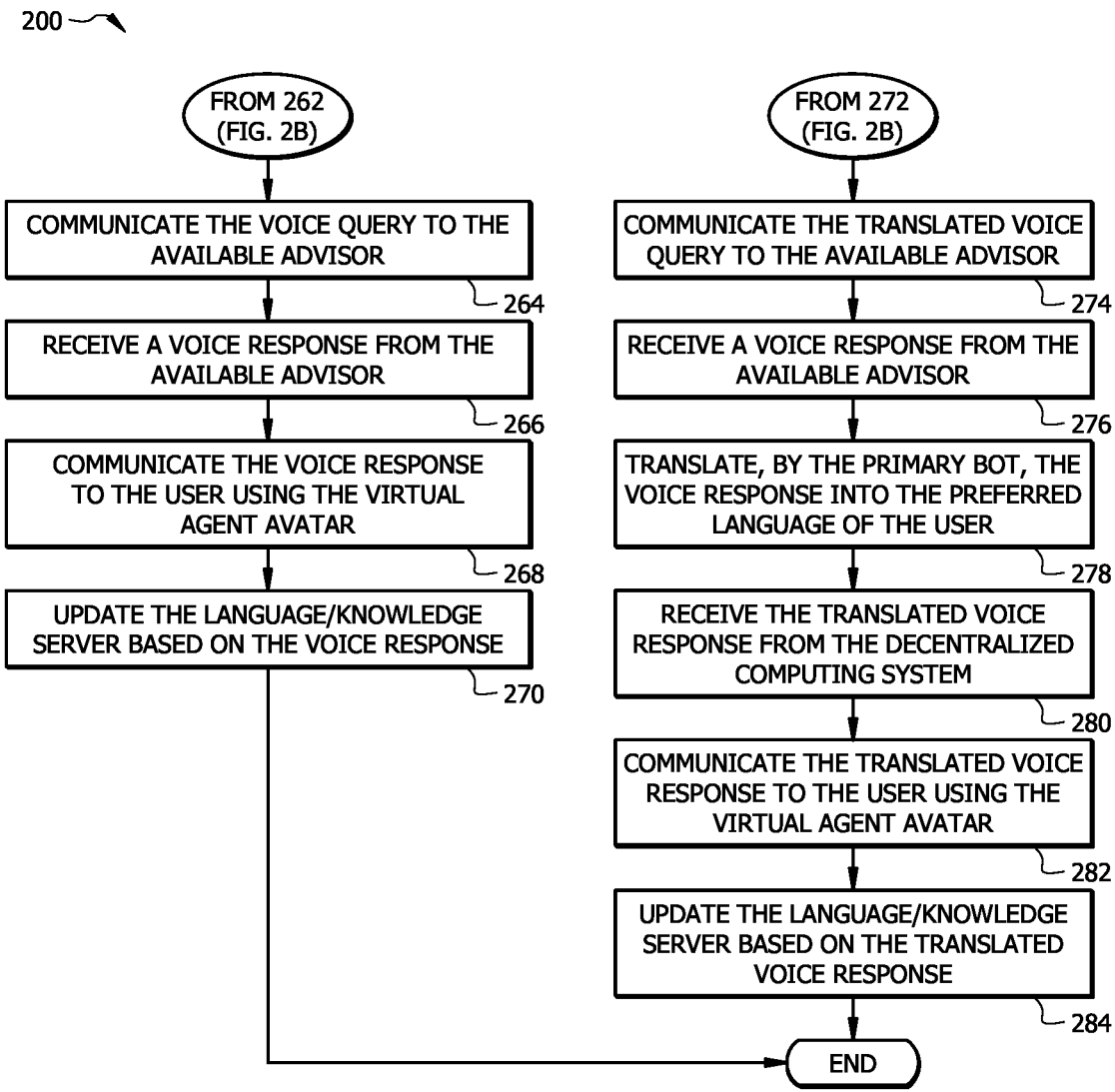

Example Method for Cross-Domain and Cross-Linguistic Knowledge-Reinforced User Servicing FIGS. 2A, 2B, and 2C illustrate an example flowchart of a method 200 for cross-domain and cross-linguistic knowledge-reinforced user servicing. Modifications, additions, or omissions may be made to method 200. Method 200 may include more, fewer, or other operations. For example, operations may be performed in parallel or in any suitable order. For example, one or more operations of method 200 may be implemented, at least in part, in the form of software instructions (e.g., instructions 120, 136, 160 and/or 174 of FIG. 1), stored on non-transitory, tangible, machine-readable medium (e.g., memories 118, 134, 158 and/or 172 of FIG. 1) that when executed by one or more processors (e.g., processors 108, 130, 150 and/or 168 of FIG. 1) may cause the one or more processors to perform operations 202-284.

At operation 202, a processor 130 of a metaverse server 128 receives user credentials 122 of a user 104a from a user device 106a.

At operation 204, the processor 130 of the metaverse server 128 compares the received user credentials 122 of the user 104a to stored user credentials 140 for the user 104a.

At operation 206, the processor 130 of the metaverse server 128 determines if the received user credentials 122 match the stored user credentials 140.

In response to determining at operation 206 that the received user credentials 122 do not match the stored user credentials 140, method 200 ends.

In response to determining at operation 206 that the received user credentials 122 match the stored user credentials 140, method 200 continues to operation 208.

At operation 208, the processor 130 of the metaverse server 128 authenticates the user 104a.

At operation 210, the processor 130 of the metaverse server 128 generates a metaverse session 142.

At operation 212, the processor 130 of the metaverse server 128 generates a virtual advisor avatar 145.

At operation 214, the processor 130 of the metaverse server 128 generates a user avatar 144 for the user 104a.

At operation 216, the processor 130 of the metaverse server 128 allows the user 104a access to the metaverse session 142 using the user avatar 144.

At operation 218, the user device 106a captures a voice query 124 of the user 104a. In certain embodiments, the microphone 114 of the user device 106a is configured to capture the voice query 124.

At operation 220, the user device 106a sends the voice query 124 to the metaverse session 142 of the metaverse server 128.

At operation 222, the processor 130 of the metaverse server 128 sends the voice query 124 to a decentralized computing system 148. In certain embodiments, a processor 150 of the decentralized computing system 148 implements a plurality of bots. The plurality of bots includes a primary bot 152 and a plurality of secondary bots 154a through 154d. In certain embodiments, each of the secondary bots 154a through 154d is configured to allow communication using a respective language/dialect.

At operation 224, the primary bot 152 analyzes the voice query 124 to determine a preferred language/dialect 164a of the user 104a.

At operation 226, the primary bot 152 analyzes the voice query 124 to determine a domain 191 and an issue 192 of the voice query 124.

At operation 228, the primary bot 152 determines a respective probability score (e.g., respective one of probability scores 162 of FIG. 1) of each secondary bot (e.g., secondary bots 154a through 154d of FIG. 1).

At operation 230, the primary bot 152 identifies a secondary bot (e.g., respective one of secondary bots 154a through 154d of FIG. 1) with a highest probability score. In certain embodiments, the secondary bot (e.g., respective one of secondary bots 154a through 154d of FIG. 1) with the highest probability score is configured to respond to the voice query 124 of the user 104a in the preferred language/preferred dialect 164a of the user 104a.

At operation 232, the processor 150 of the decentralized computing system 148 searches a language/knowledge server 166 for a response 193 corresponding to the domain 191 and the issue 192.

At operation 234, the processor 150 of the decentralized computing system 148 determines if the language/knowledge server 166 includes the response 193 corresponding to the domain 191 and the issue 192.

In response to determining at operation 234 that the language/knowledge server 166 includes the response 193 corresponding to the domain 191 and the issue 192, method 200 continues to operation 236.

At operation 236, the processor 150 of the decentralized computing system 148 retrieves the response 193 from the language/knowledge server 166.

At operation 238, the processor 150 of the decentralized computing system 148 determines a language/dialect 164b of the response 193.

At operation 240, the processor 150 of the decentralized computing system 148 determines if the language/dialect 164b of the response 193 matches with the preferred language/dialect 164a for the user 104a.

In response to determining at operation 240 that the language/dialect 164b of the response 193 matches with the preferred language/dialect 164a for the user 104a, method 200 continues to operation 242.

At operation 242, the secondary bot with the highest probability score generates a voice response 126 from the response 193. After performing operation 242, method 200 continues to operation 248.

In response to determining at operation 240 that the language/dialect 164b of the response 193 does not match with the preferred language/dialect 164a for the user 104a, method 200 continues to operation 244.

At operation 244, the primary bot 152 translates the response 193 into the preferred language/dialect 164a for the user 104a.

At operation 246, the secondary bot with the highest probability score generates a voice response 126 from the translated response 194.

At operation 248, the processor 150 of the decentralized computing system 148 sends the voice response 126 to the metaverse server 128.

At operation 250, the processor 130 of the metaverse server 128 communicates the voice response 126 to the user 104a using the virtual advisor avatar 145.

In response to determining at operation 234 that the language/knowledge server 166 does not include the response 193 corresponding to the domain 191 and the issue 192, method 200 continues to operation 252.

At operation 252, the processor 130 of the metaverse server 128 determines a location 164 of the user 104a.

At operation 254, the processor 130 of the metaverse server 128 determines a regional center (e.g., respective one of regional centers 190a through 190c of FIG. 1) based on the location 164.

At operation 256, the processor 130 of the metaverse server 128 determines an available advisor (e.g., respective one of advisors 104b through 104d of FIG. 1) within the regional center (e.g., respective one of regional centers 190a through 190c of FIG. 1).

At operation 258, the processor 130 of the metaverse server 128 notifies the available advisor (e.g., respective one of advisors 104b through 104d of FIG. 1) that the user 104a requires assistance. In certain embodiments, the processor 130 of the metaverse server 128 sends a notification 195 to the available advisor (e.g., respective one of advisors 104b through 104d of FIG. 1) that the user 104a requires assistance.

At operation 260, the processor 130 of the metaverse server 128 allows the available advisor (e.g., respective one of advisors 104b through 104d of FIG. 1) access to the metaverse session 142 using the virtual advisor avatar 145.

At operation 262, the processor 150 of the decentralized computing system 148 determines if a preferred language/dialect 164c of the available advisor (e.g., respective one of advisors 104b through 104d of FIG. 1) is same as the preferred language/dialect 164a of the user 104a.

In response to determining at operation 262 that the preferred language/dialect 164c of the available advisor (e.g., respective one of advisors 104b through 104d of FIG. 1) is same as the preferred language/dialect 164a of the user 104a, method 200 continues to operation 264.

At operation 264, the processor 130 of the metaverse server 128 communicates the voice query 124 to the available advisor (e.g., respective one of advisors 104b through 104d of FIG. 1).

At operation 266, the processor 130 of the metaverse server 128 receives a voice response 126 from the available advisor (e.g., respective one of advisors 104b through 104d of FIG. 1).

At operation 268, the processor 130 of the metaverse server 128 communicate the voice response 126 to the user 104a using the virtual agent avatar 145.

At operation 270, the processor 130 of the metaverse server 128 updates the language/knowledge server 166 based on the voice response 128. In certain embodiments, the processor 130 of the metaverse server 128 updates the knowledge database 176 of the language/knowledge server 166 based on the voice response 128. After performing operation 270, method 200 ends.

In response to determining at operation 262 that the preferred language/dialect 164c of the available advisor (e.g., respective one of advisors 104b through 104d of FIG. 1) is not same as the preferred language/dialect 164a of the user 104a, method 200 continues to operation 272.

At operation 272, the primary bot 152 of the decentralized computing system 148 translates the voice query 124 into the preferred language/dialect 164c of the available advisor (e.g., respective one of advisors 104b through 104d of FIG. 1).

At operation 274, the processor 150 of the decentralized computing system 148 communicates the translated voice query 196 to the available advisor (e.g., respective one of advisors 104b through 104d of FIG. 1).

At operation 276, the processor 150 of the decentralized computing system 148 receives a voice response 197 from the available advisor (e.g., respective one of advisors 104b through 104d of FIG. 1).

At operation 278, the primary bot 152 of the decentralized computing system 148 translates the voice response 197 into the preferred language/dialect 164a of the user 104a.

At operation 280, the processor 130 of the metaverse server 128 receive the translated voice response 198 from the decentralized computing system 148.

At operation 282, the processor 130 of the metaverse server 128 communicates the translated voice response 198 to the user 104a using the virtual agent avatar 145.

At operation 284, the processor 130 of the metaverse server 128 updates the language/knowledge server 166 based on the translated voice response 198. In certain embodiments, the processor 130 of the metaverse server 128 updates the knowledge database 176 of the language/knowledge server 166 based on the translated voice response 198.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a metaverse server comprising:
a first memory configured to store:
user credential of a plurality of users; and
a first processor communicatively coupled to the first memory, wherein the first processor is configured to:
receive first user credentials of a first user from a first user device;

authenticate the first user based on the first user credentials;
generate a metaverse session;
generate a first avatar of the first user;
generate a virtual advisor avatar;
allow the first user access to the metaverse session using the first avatar;
receive a voice query of the first user from the first user device;
send the voice query to a decentralized computing system;
in response to sending the voice query to the decentralized computing system, receive a first voice response from the decentralized computing system; and
communicate the first voice response to the first user using the virtual advisor avatar; and the decentralized computing system communicatively coupled to the metaverse server, the decentralized computing system comprising a plurality of second processors, wherein the plurality of second processors are configured to implement a plurality of bots, the plurality of bots comprising a primary bot and a plurality of secondary bots, wherein the plurality of second processors of the decentralized computing system are configured to:
receive, by the primary bot, the voice query from the metaverse server;
analyze, by the primary bot, the voice query to determine:
a preferred language/dialect of the first user;
an issue and a domain of the voice query; and
a respective probability score for each secondary bot;
identify a secondary bot with a highest probability score, the secondary bot with the highest probability score being configured to respond to the voice query in the preferred language/dialect of the first user;
search a language/knowledge server for a response corresponding to the issue and the domain;
in response to determining that the language/knowledge server includes the response corresponding to the issue and the domain, retrieve the response from the language/knowledge server;
determine a language/dialect of the response;
in response to determining that the language/dialect of the response matches the preferred language/dialect of the first user, generate, by the secondary bot with the highest probability score, the first voice response from the retrieved response, wherein the first voice response is in the preferred language/dialect of the first user; and
send the first voice response to the metaverse server.

2. The system of claim 1, wherein the plurality of second processors of the decentralized computing system is further configured to:
in response to determining that the language/dialect of the response does not match the preferred language/dialect of the first user:
translate, by the primary bot, the response into the preferred language/dialect of the first user; and
generate, by the secondary bot with the highest probability score, the first voice response from the translated response.

3. The system of claim 1, wherein the first processor of the metaverse server is further configured to:

in response to determining that the language/knowledge server does not include the response corresponding to the issue and the domain:
determine a location of the first user;
determine a regional center based on the location;
determine an available advisor within the regional center;
notify the available advisor that the first user requires assistance;
allow the available advisor access to the metaverse session using the virtual advisor avatar;
in response to determining that the preferred language/dialect of the available advisor is same as the preferred language/dialect of the first user:
communicate the voice query to the available advisor;
receive a second voice response from the available advisor; and
communicate the second voice response to the first user using the virtual advisor avatar.

4. The system of claim 3, wherein the first processor of the metaverse server is further configured to:
update the language/knowledge server based on the second voice response.

5. The system of claim 3, wherein:
the plurality of second processors of the decentralized computing system are further configured to:
translate, by the primary bot, the voice query into the preferred language/dialect of the available advisor; and
translate, by the primary bot, a third voice response into the preferred language/dialect of the first user; and
the first processor of the metaverse server is further configured to:
in response to determining that the preferred language/dialect of the available advisor is not same as the preferred language/dialect of the first user:
receive the translated voice query from the decentralized computing system;
communicate the translated voice query to the available advisor;
receive the third voice response from the available advisor;
send the third voice response to the decentralized computing system;
receive the translated third voice response from the decentralized computing system; and
communicate the translated third voice response to the first user using the virtual advisor avatar.

6. The system of claim 5, wherein the first processor of the metaverse server is further configured to:
update the language/knowledge server based on the translated third voice response.

7. The system of claim 1, wherein the first user accesses the metaverse session from a metaverse kiosk.

8. A method comprising:
receiving first user credentials of a first user from a first user device;
authenticating the first user based on the first user credentials;
generating a metaverse session;
generating a first avatar of the first user;
generating a virtual advisor avatar;
allowing the first user access to the metaverse session using the first avatar;
receiving a voice query of the first user from the first user device;

sending the voice query to a decentralized computing system, the decentralized computing system comprising a plurality of second processors, wherein the plurality of second processors are configured to implement a plurality of bots, the plurality of bots comprising a primary bot and a plurality of secondary bots;

analyzing, by the primary bot, the voice query to determine:
   a preferred language/dialect of the first user;
   an issue and a domain of the voice query; and
   a respective probability score for each secondary bot;

identifying a secondary bot with a highest probability score, the secondary bot with the highest probability score being configured to respond to the voice query in the preferred language/dialect of the first user;

searching a language/knowledge server for a response corresponding to the issue and the domain;

in response to determining that the language/knowledge server includes the response corresponding to the issue and the domain, retrieving the response from the language/knowledge server;

determining a language/dialect of the response;

in response to determining that the language/dialect of the response matches the preferred language/dialect of the first user, generating, by the secondary bot with the highest probability score, a first voice response from the retrieved response, wherein the first voice response is in the preferred language/dialect of the first user; and communicating the first voice response to the first user using the virtual advisor avatar.

9. The method of claim 8, further comprising:
in response to determining that the language/dialect of the response does not match the preferred language/dialect of the first user:
   translating, by the primary bot, the response into the preferred language/dialect of the first user; and
   generating, by the secondary bot with the highest probability score, the first voice response from the translated response.

10. The method of claim 8, further comprising:
in response to determining that the language/knowledge server does not include the response corresponding to the issue and the domain:
   determining a location of the first user;
   determining a regional center based on the location;
   determining an available advisor within the regional center;
   notifying the available advisor that the first user requires assistance;
   allowing the available advisor access to the metaverse session using the virtual advisor avatar; and
   in response to determining that the preferred language/dialect of the available advisor is same as the preferred language/dialect of the first user:
     communicating the voice query to the available advisor;
     receiving a second voice response from the available advisor; and
     communicating the second voice response to the first user using the virtual advisor avatar.

11. The method of claim 10, further comprising:
updating the language/knowledge server based on the second voice response.

12. The method of claim 10, further comprising:
in response to determining that the preferred language/dialect of the available advisor is not same as the preferred language/dialect of the first user:
   translating, by the primary bot, the voice query into the preferred language/dialect of the available advisor;
   communicating the translated voice query to the available advisor;
   receiving a third voice response from the available advisor;
   translating, by the primary bot, the third voice response into the preferred language/dialect of the first user; and
   communicating the translated third voice response to the first user using the virtual advisor avatar.

13. The method of claim 12, further comprising:
updating the language/knowledge server based on the translated third voice response.

14. The method of claim 8, wherein the first user accesses the metaverse session from a metaverse kiosk.

15. A non-transitory computer-readable medium storing instructions that, when executed by one or more processors, cause the one or more processors to:
   receive first user credentials of a first user from a first user device;
   authenticate the first user based on the first user credentials;
   generate a metaverse session;
   generate a first avatar of the first user;
   generate a virtual advisor avatar;
   allow the first user access to the metaverse session using the first avatar;
   receive a voice query of the first user from the first user device;
   send the voice query to a decentralized computing system, the decentralized computing system comprising a plurality of second processors, wherein the plurality of second processors are configured to implement a plurality of bots, the plurality of bots comprising a primary bot and a plurality of secondary bots;
   analyze, by the primary bot, the voice query to determine:
     a preferred language/dialect of the first user;
     an issue and a domain of the voice query; and
     a respective probability score for each secondary bot;
   identify a secondary bot with a highest probability score, the secondary bot with the highest probability score being configured to respond to the voice query in the preferred language/dialect of the first user;
   search a language/knowledge server for a response corresponding to the issue and the domain;
   in response to determining that the language/knowledge server includes the response corresponding to the issue and the domain, retrieve the response from the language/knowledge server;
   determine a language/dialect of the response;
   in response to determining that the language/dialect of the response matches the preferred language/dialect of the first user, generate, by the secondary bot with the highest probability score, a first voice response from the retrieved response, wherein the first voice response is in the preferred language/dialect of the first user; and
   communicate the first voice response to the first user using the virtual advisor avatar.

16. The non-transitory computer-readable medium of claim 15, wherein the instructions, when executed by the one or more processors, further cause the one or more processors to:
   in response to determining that the language/dialect of the response does not match the preferred language/dialect of the first user:

translate, by the primary bot, the response into the preferred language/dialect of the first user; and generate, by the secondary bot with the highest probability score, the first voice response from the translated response.

17. The non-transitory computer-readable medium of claim 15, wherein the instructions, when executed by the one or more processors, further cause the one or more processors to:

in response to determining that the language/knowledge server does not include the response corresponding to the issue and the domain:
determine a location of the first user;
determine a regional center based on the location;
determine an available advisor within the regional center;
notify the available advisor that the first user requires assistance;
allow the available advisor access to the metaverse session using the virtual advisor avatar; and
in response to determining that the preferred language/dialect of the available advisor is same as the preferred language/dialect of the first user:
communicate the voice query to the available advisor;
receive a second voice response from the available advisor; and
communicate the second voice response to the first user using the virtual advisor avatar.

18. The non-transitory computer-readable medium of claim 17, wherein the instructions, when executed by the one or more processors, further cause the one or more processors to:
update the language/knowledge server based on the second voice response.

19. The non-transitory computer-readable medium of claim 17, wherein the instructions, when executed by the one or more processors, further cause the one or more processors to:

in response to determining that the preferred language/dialect of the available advisor is not same as the preferred language/dialect of the first user:
translate, by the primary bot, the voice query into the preferred language/dialect of the available advisor;
communicate the translated voice query to the available advisor;
receive a third voice response from the available advisor;
translate, by the primary bot, the third voice response into the preferred language/dialect of the first user; and
communicate the translated third voice response to the first user using the virtual advisor avatar.

20. The non-transitory computer-readable medium of claim 19, wherein the instructions, when executed by the one or more processors, further cause the one or more processors to:
update the language/knowledge server based on the translated third voice response.

* * * * *